US009619428B2

(12) United States Patent
Mantor et al.

(10) Patent No.: US 9,619,428 B2
(45) Date of Patent: Apr. 11, 2017

(54) SIMD PROCESSING UNIT WITH LOCAL DATA SHARE AND ACCESS TO A GLOBAL DATA SHARE OF A GPU

(75) Inventors: Michael J. Mantor, Orlando, FL (US); Brian Emberling, San Mateo, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1434 days.

(21) Appl. No.: 12/476,130

(22) Filed: Jun. 1, 2009

(65) Prior Publication Data

US 2009/0300621 A1    Dec. 3, 2009

Related U.S. Application Data

(60) Provisional application No. 61/057,534, filed on May 30, 2008.

(51) Int. Cl.
G06F 9/38 (2006.01)
G06F 15/16 (2006.01)
G06F 9/30 (2006.01)
G06T 1/20 (2006.01)

(52) U.S. Cl.
CPC .......... *G06F 15/16* (2013.01); *G06F 9/30087* (2013.01); *G06F 9/30123* (2013.01); *G06F 9/3834* (2013.01); *G06F 9/3851* (2013.01); *G06F 9/3885* (2013.01); *G06F 9/3887* (2013.01); *G06T 1/20* (2013.01)

(58) Field of Classification Search
CPC ..................................................... G06F 9/3834
See application file for complete search history.

(56) References Cited

U.S. PATENT DOCUMENTS

| 5,581,777 A | 12/1996 | Kim et al. |
| 5,655,132 A | 8/1997 | Watson |
| 6,166,748 A | 12/2000 | Van Hook et al. |
| 6,342,892 B1 | 1/2002 | Van Hook et al. |
| 6,449,699 B2 | 9/2002 | Franke et al. |
| 7,750,915 B1 * | 7/2010 | Acocella et al. .............. 345/541 |
| 8,108,659 B1 * | 1/2012 | Le Grand ..................... 712/225 |
| 8,108,872 B1 * | 1/2012 | Lindholm et al. ............ 718/104 |

(Continued)

FOREIGN PATENT DOCUMENTS

| CN | 1170171 A | 1/1998 |
| JP | H05506113 A | 9/1993 |

(Continued)

OTHER PUBLICATIONS

Hennessy et al. "Computer Architecture: A Quantitative Approach" Morgan Kaufmann, Third Edition, May 2002, pp. 637-649 and 687-697.*
International Search Report for PCT application No. PCT/US09/03315 completed Jun. 30, 2009, 10 pgs.
Blachford, Nicholas. PS3Coderz.com: Cell Architecture Explained Version 2, copyright 2005. 38 pgs.

(Continued)

*Primary Examiner* — Jacob A Petranek
(74) *Attorney, Agent, or Firm* — Volpe and Koenig, P.C.

(57) ABSTRACT

A graphics processing unit is disclosed, the graphics processing unit having a processor having one or more SIMD processing units, and a local data share corresponding to one of the one or more SIMD processing units, the local data share comprising one or more low latency accessible memory regions for each group of threads assigned to one or more execution wavefronts, and a global data share comprising one or more low latency memory regions for each group of threads.

17 Claims, 5 Drawing Sheets

(56) References Cited

U.S. PATENT DOCUMENTS

| | | |
|---|---|---|
| 8,316,220 B2 | 11/2012 | Iwamoto |
| 2003/0014595 A1 | 1/2003 | Doteguchi et al. |
| 2003/0080963 A1 | 5/2003 | Van Hook et al. |
| 2004/0215883 A1* | 10/2004 | Bamford ............ G06F 17/3048 711/129 |
| 2005/0010743 A1* | 1/2005 | Tremblay et al. .............. 712/10 |
| 2005/0062746 A1 | 3/2005 | Kataoka et al. |
| 2007/0220232 A1* | 9/2007 | Rhoades et al. ................ 712/20 |
| 2007/0245046 A1 | 10/2007 | Asaro et al. |

FOREIGN PATENT DOCUMENTS

| | | |
|---|---|---|
| JP | H06332700 A | 12/1994 |
| JP | H08063361 A | 3/1996 |
| JP | H09198361 A | 7/1997 |
| JP | H10162130 A | 6/1998 |
| JP | 2000305841 A | 11/2000 |
| JP | 2003030047 A | 1/2003 |
| JP | 2005070938 A | 3/2005 |
| JP | 2005189975 A | 7/2005 |
| JP | 2005310167 A | 11/2005 |
| JP | 2007095065 A | 4/2007 |
| WO | WO 2005/103887 A2 | 11/2005 |
| WO | WO 2006/015868 A2 | 2/2006 |
| WO | WO 2007/038456 A1 | 4/2007 |

OTHER PUBLICATIONS

Kanter, David. NVIDIA's GT200: Inside a Parallel Processor. Copyright 1996-2001. 10 pgs.
Demmel, James W. and Volkov, Vasily. Benchmarking GPUs to Tune Dense Linear Algebra. Copyright 2008, 11 pgs.
International Preliminary Report on Patentability with Written Opinion of the International Searching Authority for International Patent Application No. PCT/US09/03315, issued Nov. 30, 2010.
European Search Report for Patent Application No. EP 09 75 5280, Munich, Germany, Completed on Oct. 24, 2012.
Office Action issued Mar. 13, 2013, in Chinese Patent Application No. 200980119960.7 with English language translation.
Office Action dispatched Sep. 4, 2013, in Japanese Patent Application No. 2011-511649, Mr. Hayakawa Yuji et al., drafted Aug. 28, 2013 with English language translation.
English language abstract of Japanese Patent No. JP H06332700 A European Patent Office, espacenet database—Worldwide.
English language abstract of Japanese Patent No. JP H09198361 A European Patent Office, espacenet database—Worldwide.
English language abstract of Japanese Patent No. JP 2005310167 A European Patent Office, espacenet database—Worldwide.
English language abstract of Japanese Patent No. JP H10162130 A European Patent Office, espacenet database—Worldwide.
English language abstract of Japanese Patent No. JP 2005189975 A European Patent Office, espacenet database—Worldwide.

\* cited by examiner

SIMD PROCESSING UNIT WITH LOCAL DATA SHARE AND ACCESS TO A GLOBAL DATA SHARE OF A GPU

CROSS-REFERENCE TO RELATED APPLICATIONS

The present application claims the benefit of U.S. Provisional Application No. 61/057,534, filed on May 30, 2008, titled "Local and Global Data Share", which is incorporated herein by reference in its entirety.

BACKGROUND

Field of the Invention

The present invention relates generally to optimizing the sharing of data between execution threads in a graphics processing unit.

Background

A graphics processing unit (GPU) is a special-purpose integrated circuit optimized for graphics processing operations. A GPU is often incorporated into computing devices (e.g., personal computers, rendering farms or servers, handheld devices, digital televisions, etc.) used for executing applications with demanding graphics processing needs, such as, for example, video game applications.

In order to improve processing efficiency, a GPU will commonly execute parallel threads using Single Instruction, Multiple Data ("SIMD", or "vector") instructions in order to achieve data level parallelism. This enables a SIMD processor to perform the same instruction on multiple pixels of data, for example, by running a separate thread of operation for each pixel on an individual SIMD lane. However, the data generated within any one SIMD lane is typically inaccessible to other SIMD lanes without the execution of computationally complex and costly data storage and retrieval instructions.

Accordingly, what is needed is an improved technique for allowing the sharing of data between SIMD lanes.

SUMMARY

Embodiments of the invention include a graphics processing unit comprising a plurality of SIMD processing units, each SIMD processing unit comprising a plurality of thread processors, a plurality of general purpose register (GPR) files, each GPR file in communication with one of the plurality of thread processors, and a local data share (LDS) in communication with each of the plurality of thread processors, and a global data share (GDS) in communication with each of the plurality of thread processors in each of the plurality of SIMD processing units.

Embodiments of the invention further include a method of manufacturing, comprising a plurality of SIMD processing units, each SIMD processing unit comprising a plurality of thread processors, a plurality of general purpose register (GPR) files, each GPR file in communication with one of the plurality of thread processors, and a local data share (LDS) in communication with each of the plurality of thread processors, and forming a global data share (GDS) in communication with each of the plurality of thread processors in each of the plurality of SIMD processing units.

Embodiments of the invention additionally include a computer-readable medium having stored thereon computer-executable instructions that, if executed by a computing device, cause the computing device to perform a method comprising allocating a set of pixels of an image to a set of SIMD processors, allocating a subset of pixels of the set of pixels to each processing lane of each of the set of SIMD processors, storing the subset of pixels in a general purpose register (GPR) file associated with each processing lane, computing a per-lane local result based on the subset of pixels, and writing the per-lane local result from the GPR file to a private area of a local data share (LDS) associated with the processing lane, the LDS associated only with the SIMD processor which contains the processing lane.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein. Additionally, and as will be apparent to one of ordinary skill in the art, the simulation, synthesis and/or manufacture of the various embodiments of this invention may be accomplished, in part, through the use of computer readable code (as noted above), including general programming languages (such as C or C++), hardware description languages (HDL) including Verilog HDL, VHDL, Altera HDL (AHDL) and so on, or other available programming and/or schematic capture tools (such as circuit capture tools).

This computer readable code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and internets. It is understood that the functions accomplished and/or structure provided by the systems and techniques described above can be represented in a core (such as a GPU core) that is embodied in program code and may be transformed to hardware as part of the production of integrated circuits.

Figure 1:
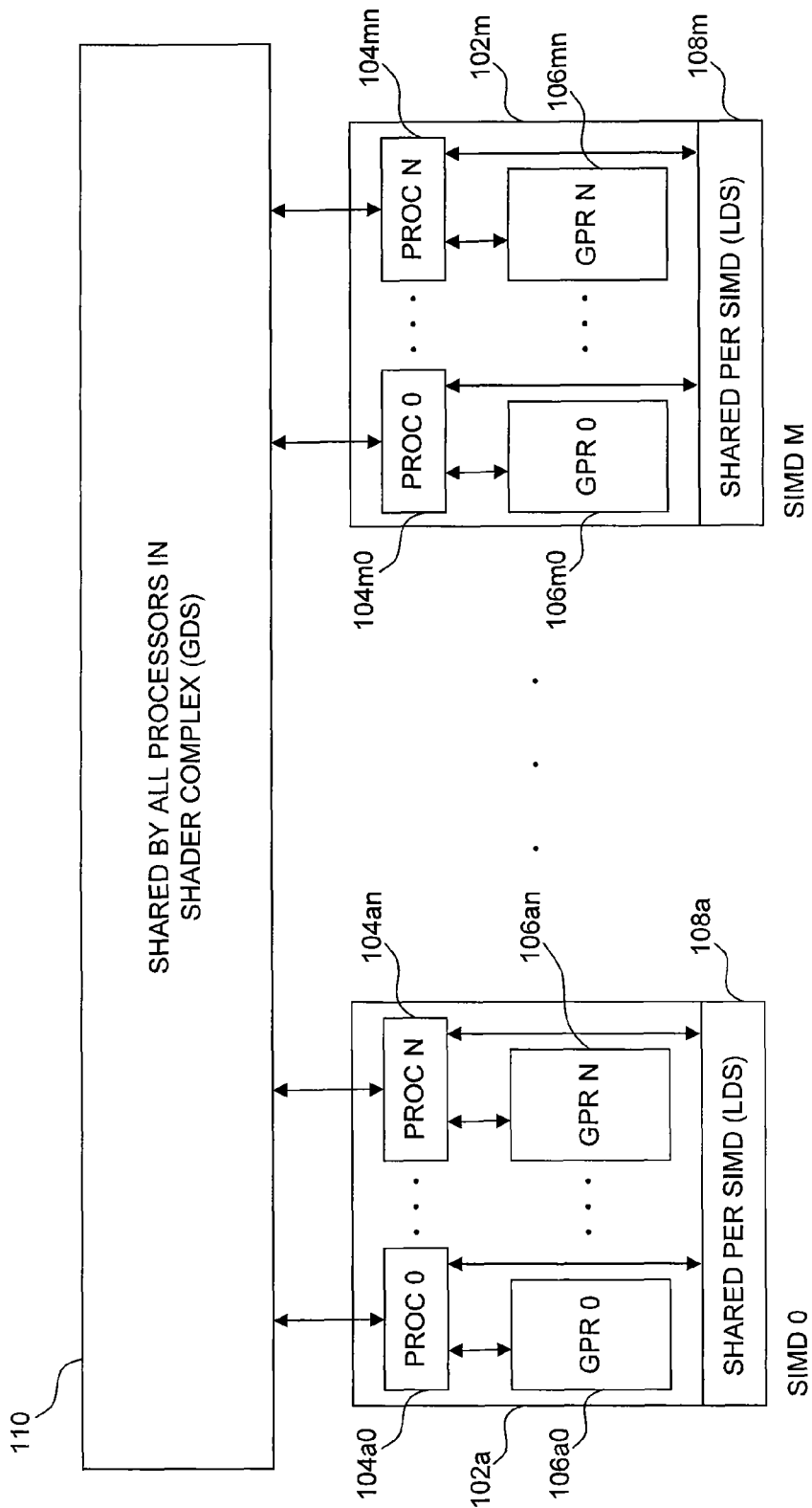
FIG. 1 is a computing architecture, in accordance with an embodiment of the present invention.

FIG. 1 illustrates a computing architecture 100, in accordance with an embodiment of the present invention. Architecture 100 includes one or more SIMD processors 102a-102m. Each SIMD processor includes one or more thread processors 104a0-104an, shown in SIMD 0 102a, and 104m0-104mn, shown in SIMD m 102m, in accordance with an embodiment of the present invention. Each thread processor is also associated with a General Purpose Register ("GPR") file 106a0-106an, shown in SIMD 0 102a, and 106m0-106mn, shown in SIMD m 102m, in accordance with an embodiment of the present invention. Although the labels demonstrate that a plurality of SIMD processors, each with a plurality of thread processors and GPR files, are contemplated within the scope of the present invention, reference will occasionally be made to individual SIMD processors, thread processors, and GPR files by the base reference numbers (e.g., 102, 104, and 106).

The combination of a single thread processor 104 and its associated GPR file 106 is commonly termed a SIMD processing lane (or simply "lane" or "SIMD lane"). One skilled in the relevant arts will appreciate that additional elements associated with the thread processor 104 and GPR file 106 may constitute part of a single SIMD lane, and the particular embodiment illustrated in FIG. 1 is shown by way of example, and not limitation.

Architecture 100 further includes local data shares ("LDS") 108a-108m, with one LDS 108 associated with each SIMD processor 102, in accordance with an embodiment of the present invention. Moreover, architecture 100 includes a global data share ("GDS") 110, which is accessible by each thread processor 104 of each SIMD processor 102. The LDS and GDS are discussed in further detail below.

When executing a process on architecture 100, the process can spawn a collection of threads for execution on a SIMD processor 102. Each thread in the collection of threads is assigned to a particular SIMD lane within SIMD processor 102, and therefore each thread is assigned to a particular thread processor 104 and GPR file 106. In accordance with an embodiment of the present invention, this collection of threads spawned from a common process is assigned as a "wavefront" to a SIMD processor 102, which allows for temporarily masking the execution of individual threads in the wavefront. Multiple wavefronts may be assigned to a SIMD processor 102, as may any other collections of threads, in accordance with an embodiment of the present invention. All threads running within SIMD processor 102, comprised of multiple wavefronts, or any subset thereof, are collectively referred to as a group of threads.

II. General Purpose Register

In accordance with an embodiment of the present invention, each SIMD processor 102 includes one or more thread processors 104, each thread processor associated with a GPR file 106. As noted above, a wavefront is assigned to a SIMD processor. Each thread in the wavefront is assigned to a particular SIMD lane for execution, and therefore assigned to a particular thread processor 104 and GPR file 106 associated with the SIMD lane. A thread executing on thread processor 104 is able to read from and write to registers of GPR file 106 of the same lane. One skilled in the relevant arts will appreciate that many register access implementations exist which would enable thread processor 104 to communicate with GPR file 106 in order to access registers in GPR file 106, and embodiments of the present invention are not limited to any particular implementation.

Each GPR file 106 contains a designated private space, or register block, associated with a thread executing on thread processor 104, in accordance with an embodiment of the present invention. In accordance with a further embodiment of the present invention, GPR file 106 is segmented into a plurality of private register blocks ahead of time. New threads executing in thread processor 104 are assigned a private register block upon first execution, and become the only threads with write access to the private register block.

In accordance with an additional embodiment of the present invention, GPR file 106 contains a shared global pool to which any thread executing on thread processor 104, regardless of which wavefront the thread is associated with, is able to write, as well as read from. This functionality allows neighboring threads to access a reserved global area, and thereby allow reading, modifying, and writing on order-independent associative global data. This functionality further allows for fast sharing between threads belonging to different wavefronts that are nevertheless assigned to a same SIMD lane.

III. Local Data Share

As noted above, each SIMD processor 102 includes a LDS 108. This LDS 108 is directly accessible to every thread processor 104 within the same SIMD processor 102. In accordance with an embodiment of the present invention, LDS 108 is segmented into a plurality of private write spaces, each private write space corresponding to, and reserved for, a thread of execution for a thread processor 104. In accordance with an additional embodiment of the present invention, each private write space corresponds to a thread processor 104. One skilled in the relevant arts will appreciate that the manner of segmentation of LDS 108 may vary, and the aforementioned segmentation formats are presented by way of example, and not limitation.

A thread running on thread processor 104 assigned to a private write space of LDS 108 is capable of writing to, and reading from, the assigned private write space, in accordance with an embodiment of the present invention. Additionally, any thread processor 104 is able to read from any private write space of LDS 108, thereby enabling thread processors 104 to share data within SIMD processor 102. One skilled in the relevant arts will appreciate that, although LDS 108 operates using an "owner-write" model, other access models may be utilized, and the owner-write model is presented by way of example, and not limitation.

In accordance with an additional embodiment of the present invention, an individual thread assigned to a private write space of LDS 108 is capable of writing to, and reading from, the assigned private write space. Any thread executing on SIMD 102, including those executing on other thread processors 104, is then able to read data from the assigned private write space.

Providing LDS 108 with an owner-write model enables the sharing of data not only among threads executing on a single thread processor 104, as in the GPR sharing above, but also among all threads running on all thread processors 104 of SIMD 102. This allows threads within a wavefront to share data with other threads within that same wavefront. Additionally, this behavior allows threads running within any wavefront executing on the same SIMD 102 to access data from threads belonging to any other wavefront in the group of threads.

Figure 2:
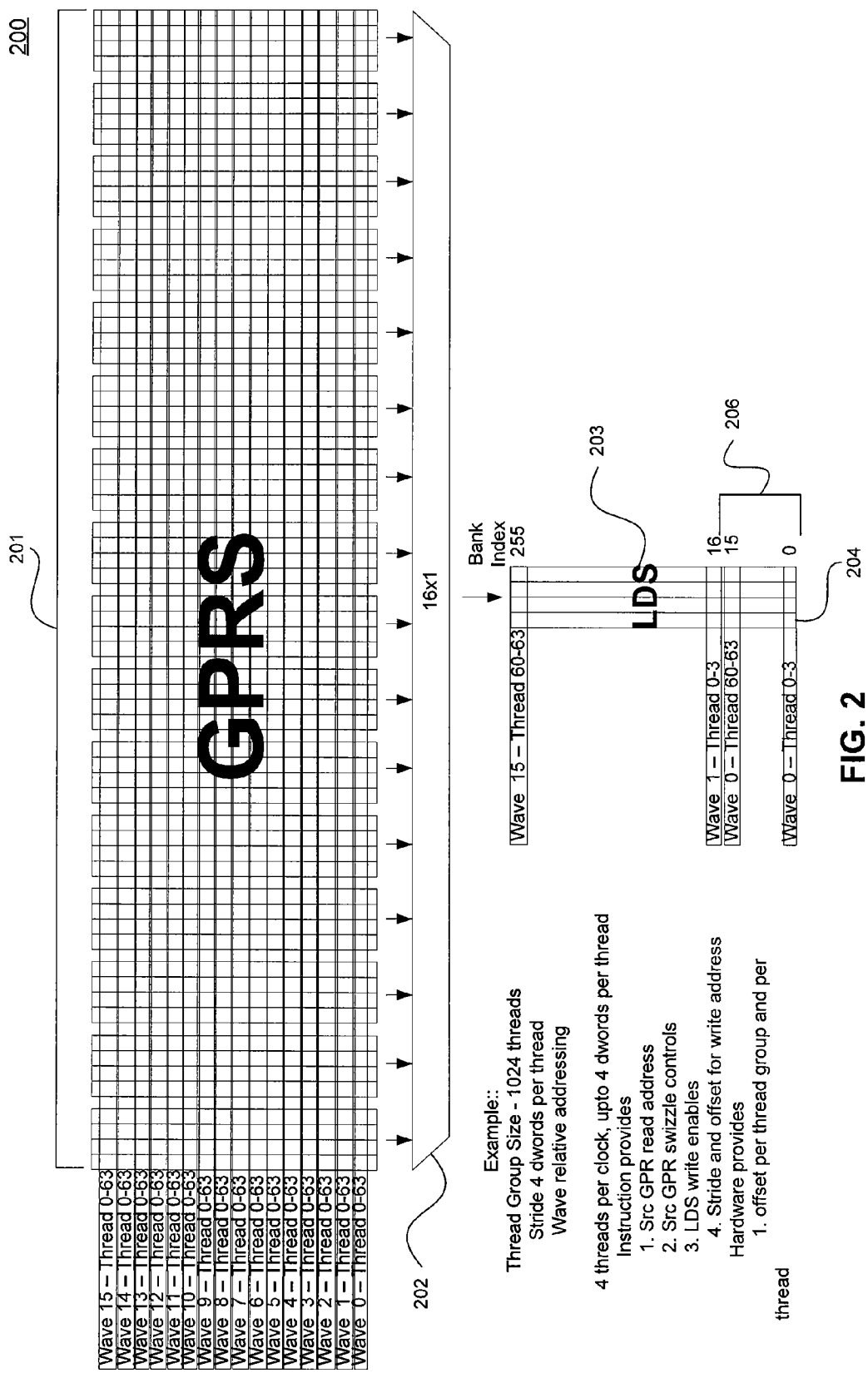
FIG. 2 is a local data share, in accordance with an embodiment of the present invention.

FIG. 2 illustrates a LDS memory write architecture 200, corresponding to the LDS 108a-108m of FIG. 1, in accordance with an embodiment of the present invention. One skilled in the relevant arts will appreciate that the data widths and logic layout shown in FIG. 2 need not be implemented exactly as shown, and that a varying number of data widths and logic layouts can be accommodated. The collection of all GPR files 106 within a single SIMD processor 102 are shown in FIG. 2 as GPRs 201.

In accordance with an embodiment of the present invention, writing data from the GPRs 201 into the LDS 203 is accomplished by writing the data to an address within the LDS corresponding to a thread_vector write location, which is a section of the LDS reserved for a particular thread of execution. This is termed the thread's private write space within the LDS. One skilled in the relevant arts will appreciate that several addressing modes can be used, and this addressing mode is presented by way of example, and not limitation.

In accordance with a further embodiment of the present invention, the private write space within the LDS is variable. By way of example, and not limitation, private write space is assigned as one register per thread, accommodating up to sixteen wavefronts, or, alternatively, sixteen registers and only one wavefront. One skilled in the relevant arts will recognize that a number of combinations of number of registers assigned per thread, and the resulting total number of wavefronts which may be accommodated by the LDS, exist, and the above grouping is provided by way of example, and not limitation. In an additional embodiment, the wavefronts can also be grouped into variable size groups of threads.

In accordance with an additional embodiment of the present invention, one or more multiplexers 202 are configured to write data into LDS 203 from GPRs 201. When a write is scheduled, data is read from the GPRs 201 and written to the LDS 203. In an embodiment, data for four threads is written from GPRs 201 to LDS 203 in a single clock cycle.

As previously noted, there is one LDS memory 108/203 per SIMD processor 102, in accordance with an embodiment of the present invention. Each wavefront executing within SIMD processor 102 is assigned to a wavefront memory region within LDS 108, in accordance with an additional embodiment of the present invention. Each thread comprising the wavefront is assigned to a particular memory region within this greater wavefront memory region. This prevents threads from writing data to a memory region to which it is not assigned or shared by other threads of its corresponding wavefront, but enables threads to exchange data within its assigned memory region.

By way of example, and not limitation, LDS memory 203 is indexed by separating the memory into memory regions corresponding to each wavefront. For example, memory region 206 corresponds to wavefront 0. When writing to memory region 206, threads 0-3 of wavefront 0 are scheduled to write to LDS 203 at bank index 0, shown at 204. In an embodiment, this write occurs within a single clock cycle. This process is repeated for each set of four threads within wavefront 0, with each consecutive set of four threads writing to the next bank in a subsequent clock cycle. One skilled in the relevant arts will appreciate that the timing and memory sizing values are provided by way of example, and not limitation.

In accordance with a further embodiment of the present invention, a special broadcast read mode is available which permits the fast reading of data from the LDS which is returned to all threads in a wavefront, or to shared registers. In an embodiment, the broadcast read mode performs a fast read of one to four dwords of data, and returns the data in four clock cycles to all threads within the respective wavefront.

In accordance with an additional embodiment of the present invention, a barrier instruction is implemented. This barrier instruction, which would be present within all threads spawned from a same process (e.g., a group of threads, or a wavefront), forces all of the threads to synchronize to that barrier point before proceeding. This can be used, by way of example and not limitation, to prevent hazard conditions when accessing the LDS. For example, if a thread executes a read instruction for data in the LDS written by a different thread from another wavefront, it is unknown whether the data the thread wishes to read is available at this point. By placing the write instruction that provides this data prior to the barrier instruction, and placing the read instruction after the barrier instruction, it is possible to guarantee that the read instruction will obtain the correct data from the LDS. One skilled in the relevant arts will appreciate that other uses of this barrier instruction are possible, including, by way of example and not limitation, the avoidance of other access hazards.

IV. Global Data Share

Figure 3:
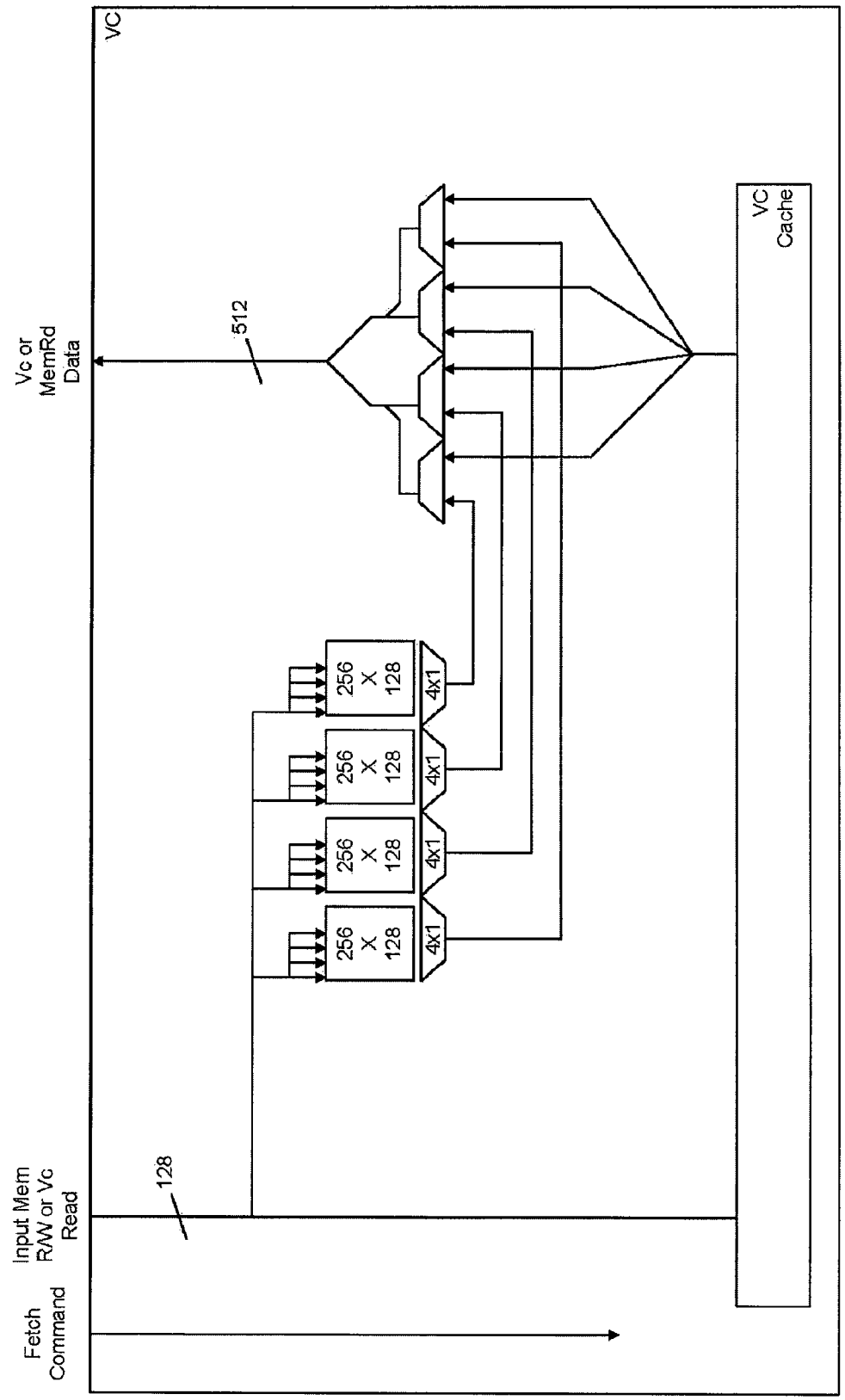
FIG. 3 is a global data share, in accordance with an embodiment of the present invention.

FIG. 3 is a GDS 300 that supports read and write operations from all SIMD processing units, in accordance with an embodiment of the present invention. Additionally, a SIMD processing unit is operable to request data from the GDS 300 with broadcast, which allows the GDS to update all of the GPR files in the system with broadcast data from the GDS 300, in accordance with a further embodiment of the present invention.

One skilled in the relevant arts will appreciate that the data widths and logic layout shown in FIG. 3 need not be implemented exactly as shown, and that a varying number of data widths and logic layouts can be accommodated.

V. Example Application

Figure 4:
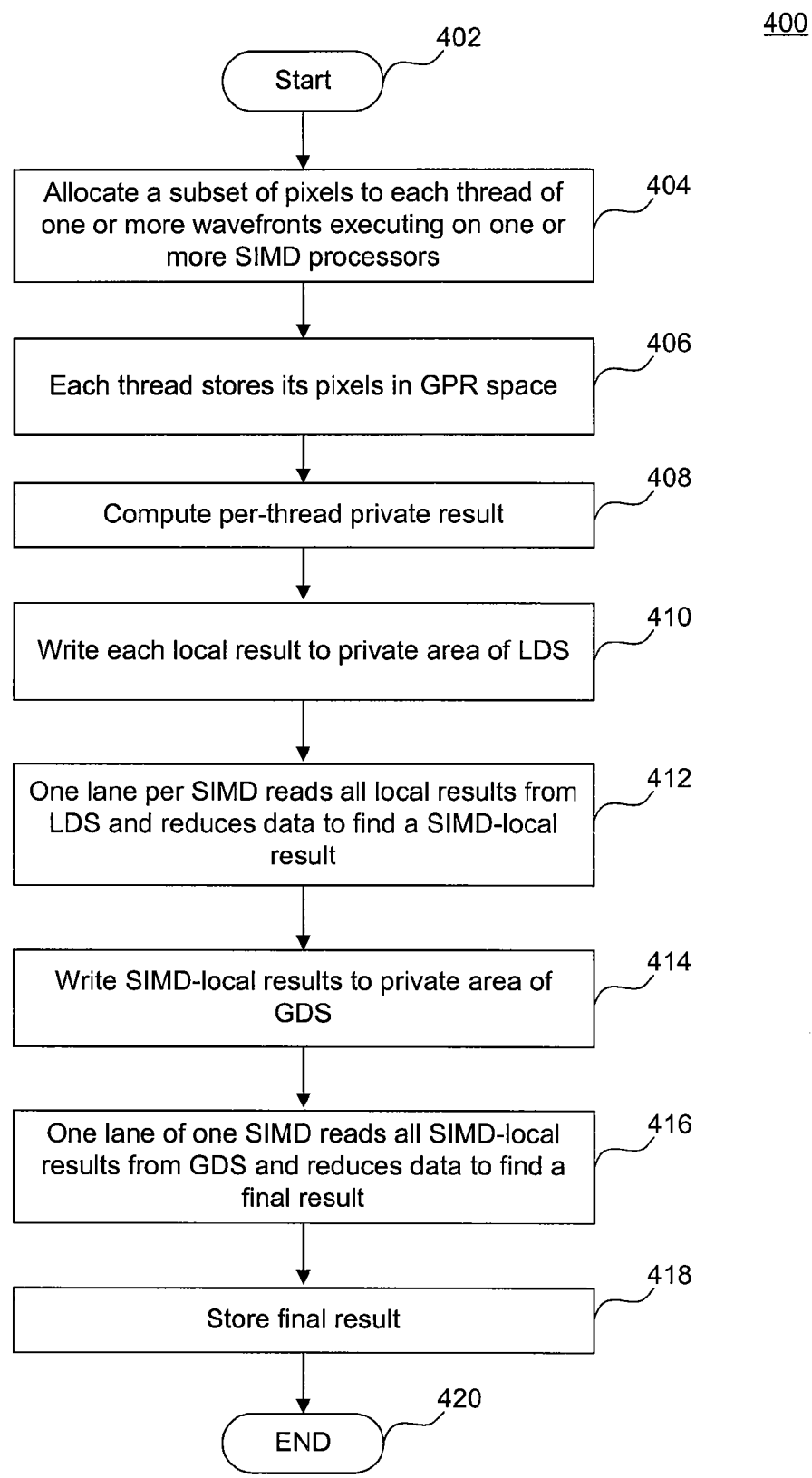
FIG. 4 is a flow chart illustrating steps by which the computing architecture can be utilized to improve an image processing algorithm, in accordance with an embodiment of the present invention.

FIG. 4 is a flowchart 400 illustrating an example application utilizing the aforementioned functionality of the private GPR space, global GPR space, LDS, and GDS, in accordance with an embodiment of the present invention. By way of example, and not limitation, the flowchart 400 can be utilized to compute a property on an image in a single pass, such as the maximum and minimum brightness values of the image. One skilled in the relevant arts will appreciate that other applications can utilize the configuration of the private GPR space, global GPR space, LDS, and GDS, and flowchart 400 is presented by way of example, and not limitation.

The method begins at step 402 and proceeds to step 404 where a subset of pixels of the image are allocated to one or more wavefronts. Within each wavefront, a subset of pixels assigned to the wavefront are allocated to each thread of the wavefront assigned to a SIMD processor 102. Each thread of the wavefront executes within a lane of the assigned SIMD processor 102, the lane corresponding to a particular thread processor 104 and its associated GPR file 106. As one or more wavefronts may be executing within a single SIMD processor 102, multiple threads performing the steps of flowchart 400 may be assigned to a same lane within a same SIMD processor 102.

At step 406, each thread's corresponding subset of pixels are stored within its associated GPR file 106. Individual threads on a thread processor 104 then compute a per-thread private result at step 408. In the context of the maximum and minimum brightness values example, thread processor 104 computes the maximum and minimum brightness values for the subset of pixels which the executing thread has been assigned. Each lane of a wavefront atomically combines its results with the per lane results stored in the global GPR space of each lane. After all pixels of the image have been scheduled, a reduction phase starts with the "local result," stored in the global register being written to the thread's private area of LDS 108.

For each SIMD 102, one lane is then configured to read all of the local results produced by each lane of SIMD 102 and reduces the data to find a SIMD-local result at step 412. For example, a lane corresponding to a single thread processor 104 is assigned to reduce the local results to find the SIMD-local result. That thread processor 104 then reads all of the local results from LDS 108 into its GPR file 106, and computes the maximum and minimum brightness values among all of the local results. The result of this computation becomes the SIMD-local result. At step 414, the thread processor 104 writes the SIMD-local results to a private area of GDS 110.

Similarly, at step 416, a single thread processor 104 reads and collects all of the SIMD-local results from GDS 110 and reduces the data to find a final result. For example, a single thread processor 104 reads all of the SIMD-local results from GDS 110 into its GPR file 106, and computes the maximum and minimum brightness values among all of the SIMD-local results. The result of this computation becomes the final result of the reduction. At step 418, the final result is then stored to a memory location. In accordance with an additional embodiment of the present invention, the final result is stored back to the GDS, and the store operation is followed with a broadcast read to populate the GPR files 106 for a second pass of the operations described in flowchart 400, using the final result computed at step 418 as an intermediate result

VI. Computer System Implementation

Figure 5:
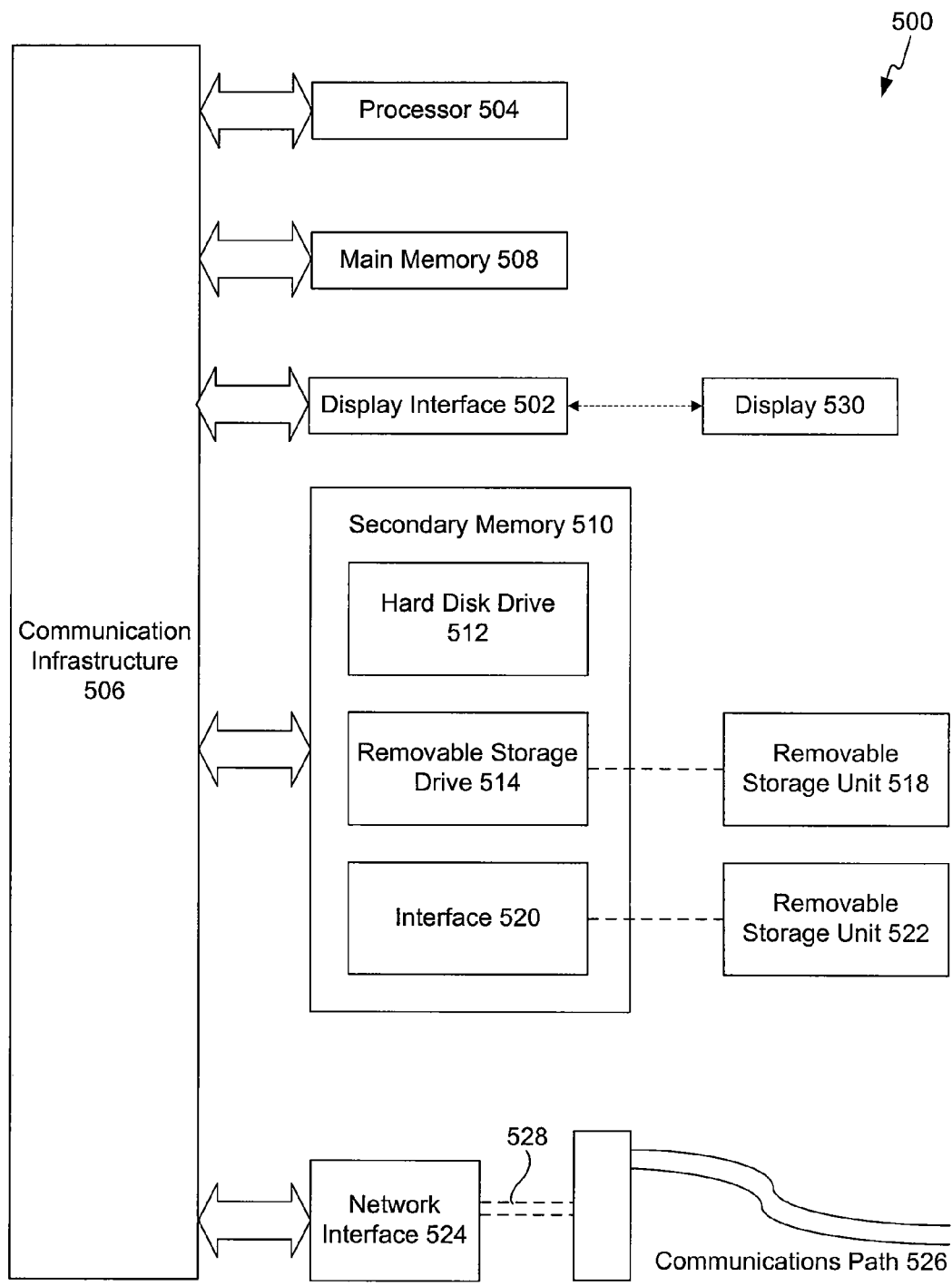
FIG. 5 depicts an example computer system in which embodiments of the present invention may be implemented.

Various aspects of the present invention can be implemented by software, firmware, hardware, or a combination thereof. FIG. 5 illustrates an example computer system 500 in which the present invention, or portions thereof, can be implemented as computer-readable code. Various embodiments of the invention are described in terms of this example computer system 500. After reading this description, it will become apparent to a person skilled in the relevant art how to implement the invention using other computer systems and/or computer architectures.

Computer system 500 includes one or more processors, such as processor 504. Processor 504 can be a special purpose or a general purpose processor. Processor 504 is connected to a communication infrastructure 506 (e.g., a bus or network).

Computer system 500 also includes a main memory 508, preferably random access memory (RAM), and can also include a secondary memory 510. Secondary memory 510 can include, for example, a hard disk drive 512, a removable storage drive 514, and/or a memory stick. Removable storage drive 514 can comprise a floppy disk drive, a magnetic tape drive, an optical disk drive, a flash memory, or the like. The removable storage drive 514 reads from and/or writes to a removable storage unit 518 in a well known manner. Removable storage unit 518 can comprise a floppy disk, magnetic tape, optical disk, etc. which is read by and written to by removable storage drive 514. As will be appreciated by persons skilled in the relevant art, removable storage unit 518 includes a computer-usable storage medium having stored therein computer software and/or data.

In alternative implementations, secondary memory 510 can include other similar means for allowing computer programs or other instructions to be loaded into computer system 500. Such means can include, for example, a removable storage unit 522 and an interface 520. Examples of such means can include a program cartridge and cartridge interface (such as those found in video game devices), a removable memory chip (e.g., EPROM or PROM) and associated socket, and other removable storage units 522 and interfaces 520 which allow software and data to be transferred from the removable storage unit 522 to computer system 500.

Computer system 500 can also include a communications interface 524. Communications interface 524 allows software and data to be transferred between computer system 500 and external devices. Communications interface 524 can include a modem, a network interface (such as an Ethernet card), a communications port, a PCMCIA slot and card, or the like. Software and data transferred via communications interface 524 are in the form of signals which can be electronic, electromagnetic, optical, or other signals capable of being received by communications interface 524. These signals are provided to communications interface 524 via a communications path 526. Communications path 526 carries signals and can be implemented using wire or cable, fiber optics, a phone line, a cellular phone link, a RF link or other communications channels.

In this document, the terms "computer program medium" and "computer-usable medium" are used to generally refer to media such as removable storage unit 518, removable storage unit 522, and a hard disk installed in hard disk drive 512. Signals carried over communications path 526 can also embody the logic described herein. Computer program medium and computer-usable medium can also refer to memories, such as main memory 508 and secondary memory 510, which can be memory semiconductors (e.g., DRAMs, etc.). These computer program products are means for providing software to computer system 500.

Computer programs (also called computer control logic or data and/or instructions) are stored in main memory 508 and/or secondary memory 510. Computer programs can also be received via communications interface 524. Such computer programs, when executed, enable computer system 500 to implement the present invention as discussed herein. In particular, the computer programs, when executed, enable processor 504 to implement the processes of the present invention. Accordingly, such computer programs represent controllers of the computer system 500. Where the invention is implemented using software, the software can be stored in a computer program product and loaded into computer system 500 using removable storage drive 514, interface 520, hard drive 512 or communications interface 524.

The invention is also directed to computer program products comprising software stored on any computer-usable medium. Such software, when executed in one or more data processing device, causes a data processing device(s) to operate as described herein or, as noted above, allows for the synthesis and/or manufacture of computing devices (e.g., ASICs, or processors) to perform embodiments of the present invention described herein. Embodiments of the invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

VII. Conclusion

While various embodiments of the present invention have been described above, it should be understood that they have been presented by way of example only, and not limitation. It will be understood by those skilled in the relevant art that various changes in form and details can be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A graphics processing unit comprising:
a plurality of SIMD processing units, each SIMD processing unit comprising:
a plurality of thread processors,
a plurality of general purpose register (GPR) files, each GPR file m communication with one of the plurality of thread processors, and
a local data share (LDS) in bi-directional communication with the plurality of thread processors,
wherein the plurality of thread processors are assigned a plurality of threads for execution,
wherein the LDS has a private write space assigned to one of the plurality of thread processors and a public write space accessible by more than one of the plurality of thread processors,
wherein only the one of the plurality of thread processors has both read and write access to the private write space, and
wherein the plurality of thread processors have direct read access to the private write space; and
a global data share (GDS) in communication with each of the plurality of thread processors in each of the plurality of SIMD processing units.

2. The graphics processing unit of claim 1, wherein each GPR file comprises:
a private block of registers assigned to a first thread of one or more threads executing on the thread processor associated with the GPR file, wherein only the first thread is able to read or write to the private block; and
a global block of registers, wherein any thread of the one or more threads is able to read from and write to the global block.

3. The graphics processing unit of claim 1, wherein the size of the private write space is variable.

4. The graphics processing unit of claim 1, wherein the GDS comprises:
a private write space assigned to one of the plurality of thread processors of the plurality of SIMD processing units.

5. The graphics processing unit of claim 4, wherein the GDS enforces write access only by the one of the plurality of thread processors of the plurality of SIMD processing units to the private write space, and wherein the plurality of SIMD processing units are able to read from the private write space.

6. A method of manufacturing, comprising:
physically forming a plurality of SIMD processing units, each SIMD processing unit comprising:
a plurality of thread processors,
a plurality of general purpose register (GPR) files, each GPR file in communication with one of the plurality of thread processors, and
a local data share (LDS) in bi-directional communication with the plurality of thread processors,
wherein the plurality of thread processors are assigned a plurality of threads for execution,
wherein the LDS has a private write space assigned to one of the plurality of thread processors and a public write space accessible by more than one of the plurality of thread processors,
wherein only the one of the plurality of thread processors has both read and write access to the private write space, and wherein the plurality of thread processors have direct read access to the private write space; and
physically forming a global data share (GDS), the GDS in communication with each of the plurality of thread processors in each of the plurality of SIMD processing units.

7. The method of claim 6, wherein physically forming each of the plurality of SIMD processing units comprises:
physically forming each of the plurality of GPR files, each GPR file comprising:
a private block of registers assigned to a first thread of one or more threads executing on the thread processor associated with the GPR file, wherein only the first thread is able to write to the private block, and wherein any thread of the one or more threads is able to read from the private block; and
a global block of registers, wherein any thread of the one or more threads is able to read from and write to the global block.

8. The method of claim 6, wherein the size of the private write space is variable.

9. The method of claim 6, wherein the GDS comprises:
a private write space assigned to one of the plurality of thread processors of the plurality of SIMD processing units.

10. The method of claim 9, wherein the GDS enforces write access only by the one of the plurality of thread processors of the plurality of SIMD processing units to the private write space, and wherein the plurality of SIMD processing units are able to read from the private write space.

11. A graphics processing unit comprising:
a first SIMD processing unit and a second SIMD processing unit, each SIMD processing unit comprising:

a plurality of thread processors, a plurality of general purpose register (GPR) files, each GPR file in communication with one of the plurality of thread processors, and a local data share (LDS) in bi-directional communication with the plurality of thread processors, wherein the plurality of thread processors are assigned a plurality of threads for execution, wherein the LDS has a private write space assigned to one of the plurality of thread processors and a public write space accessible by more than one of the plurality of thread processors, wherein only the one of the plurality of thread processors has both read and write access to the private write space, and wherein the plurality of thread processors have direct read access to the private write space; and a global data share (GDS) in communication with each of the plurality of thread processors in the first SIMD processing unit and the second SIMD processing unit.

12. A non-transitory computer-readable storage device having computer-executable instructions stored thereon, execution of which, by a computing device, causes the computing device to perform operations comprising:

synthesizing a plurality of SIMD processing units, each SIMD processing unit comprising:

a plurality of thread processors, a plurality of general purpose register (GPR) files, each GPR file in communication with one of the plurality of thread processors, and a local data share (LDS) in bi-directional communication with each of the plurality of thread processors, wherein each of the plurality of thread processors are assigned a plurality of threads for execution and the LDS is directly accessible to each thread, wherein the LDS has a private write space assigned to one of the plurality of thread processors and a public write space accessible by more than one of the plurality of thread processors, wherein only the one of the plurality of thread processors has both read and write access to the private write space, and wherein the plurality of thread processors have direct read access to the private write space; and synthesizing a global data share (GDS), the GDS in communication with each of the plurality of thread processors in each of the plurality of SIMD processing units.

13. The non-transitory computer-readable storage device recited in claim 12, wherein synthesizing each of the plurality of SIMD processing units comprises:

synthesizing each of the plurality of GPR files, each GPR file comprising:

a private block of registers assigned to a first thread of one or more threads executing on the thread processor associated with the GPR file, wherein only the first thread is able to write to the private block, and wherein any thread of the one or more threads is able to read from the private block; and a global block of registers, wherein any thread of the one or more threads is able to read from and write to the global block.

14. The non-transitory computer-readable storage device recited in claim 12, wherein the size of the private write space is variable.

15. The non-transitory computer-readable storage device recited in claim 12, wherein the GDS comprises:

a private write space assigned to one of the plurality of thread processors of the plurality of SIMD processing units.

16. The non-transitory computer-readable storage device recited in claim 15, wherein the GDS enforces write access only by the one of the plurality of thread processors of the plurality of SIMD processing units to the private write space, and wherein the plurality of SIMD processing units are able to read from the private write space.

17. The non-transitory computer-readable storage device recited in claim 12, wherein the synthesizing the plurality of SIMD processing units comprises synthesizing using a hardware description language, and wherein the synthesizing the global data share (GDS) comprises synthesizing using the hardware description language.

* * * * *